Jan. 28, 1969 D. PIMENTEL 3,424,332
OUTLET BOX WITH COVER AND MOUNTING MEANS THEREFOR
Filed Aug. 15, 1966 Sheet 1 of 2
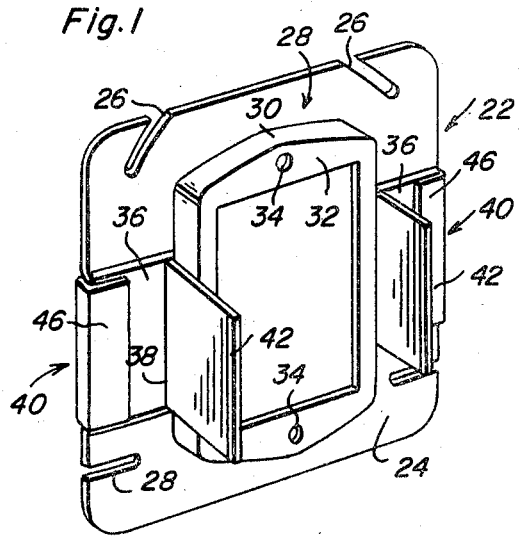
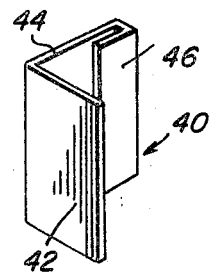
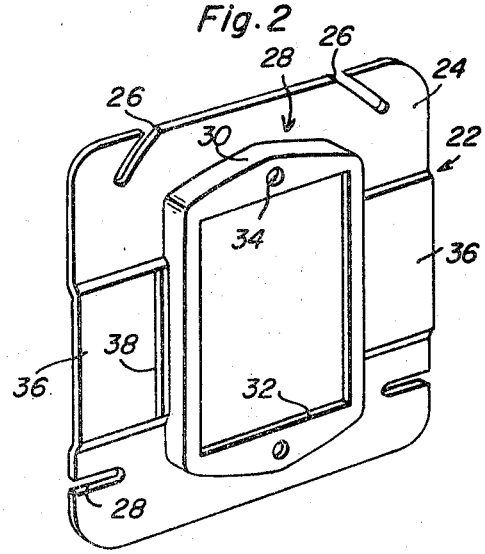
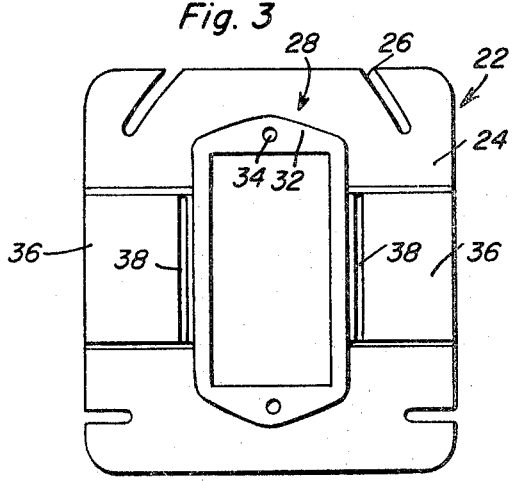
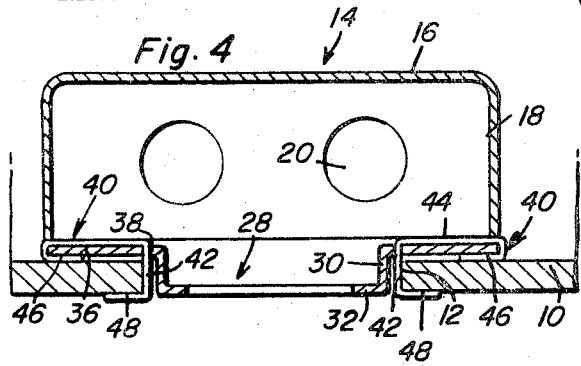
Demetrio Pimentel
INVENTOR.

Jan. 28, 1969 D. PIMENTEL 3,424,332
OUTLET BOX WITH COVER AND MOUNTING MEANS THEREFOR
Filed Aug. 15, 1966

Demetrio Pimentel
INVENTOR.

United States Patent Office 3,424,332
Patented Jan. 28, 1969

3,424,332
OUTLET BOX WITH COVER AND MOUNTING MEANS THEREFOR
Demetrio Pimentel, Brooklyn, N.Y.
(145—49 178th Place, Springfield Gardens, N.Y. 11434)
Filed Aug. 15, 1966, Ser. No. 572,313
U.S. Cl. 220—3.6    5 Claims
Int. Cl. H02g 3/12, 3/14; H05k 5/03

ABSTRACT OF THE DISCLOSURE

An electrician's outlet box having an open front closed by an attached but removable cover plate provided with a centralized integral collar. This collar, when in use, projects into a hole provided therefor in a room wall. Unique mounting clips are secured to the cover plate for the purpose of securing the combined box and cover plate in operable position in the hole in the room wall.

---

The present invention relates to an open front electric outlet box of a type which is in common use by electricians providing wiring service and has to do with a box whose open front is adapted to be closed by a cover and wherein said cover is, in turn, provided with improved mounting means.

As will be clearly evident after having read the introductory statement of the subject matter of the invention, it is common practice in the electrical outlet and junction box art to utilize an attachable and detachable cover plate for the open front of the box, said cover plate being marginally slotted and attached to lugs or the like on the open front of the box with the aid of attaching and retaining screws or equivalent fasteners. It is also common in the art to provide a type of cover plate which has a central opening or aperture bordered or marginally encompassed by an outstanding piloting neck or collar (as herein shown) and as also shown in the outlet box of a patent to one Buckels, 2,808,172, and further shown in the electrical box cover of Rudolph, 2,987,211.

An object of the present invention is to structurally, functionally and in other important ways to improve upon electrical outlet box covers and, more particularly, to provide novel and improved mounting means, wherein said means is carried by the cover, is fittingly projected through marginal portions of a box accommodating hole in a wall or wallboard panel as the case may be and which is such in construction that it is not necessary to resort to the use of headed fasteners to anchor the cover plate in its properly installed position.

Briefly, the herein disclosed generic concept relies for distinctiveness and novelty on an outlet box which is of the conventional cup-like type and which has an open front with suitable lugs or the like for attaching marginal portions of a cover plate in a generally well-known manner. The embossed or protruding central portion of the cover plate is provided with a neck or collar which in turn is provided with a lateral turned in endless flange providing a lip. The collar is intended to project into the usual wall-hole provided therefor. The mounting and retaining means for the box and complemental cover plate is attached to and carried by diametrically opposite marginal portions of the cover plate.

More specifically, the improved mounting means, also generically construed, is characterized by at least one pair of clips. The types of clips which are herein shown and described vary slightly in form. Broadly, however, each clip means is characterized by a pair of clips. Each clip has an L-shaped body portion characterized long and short limbs. The long limb is of a length that it is capable of being projected outwardly through and beyond a coacting portion of the wall-hole in a manner to permit the free end portion to be gripped with a pair of pliers and bent outwardly in such a manner that it can be clinched and bound against the exterior surface of the wall or panel to securely position and maintain the overall assemblage in its intended place.

It is within the purview of the invention to connect or attach the attachable end portion of the short limb of each L-shaped clip in any one of several different ways (FIGS. 1, 6 and 8). To the ends desired, the cover plate may be (1) provided with a slot and the long limb passed through the slot with a terminal end of the short limb bent and fashioned into a hook and engaged over an edge portion of the cover plate. Alternatively the short limb can be (2) superimposed upon a front face of the plate and secured thereto either by a screw or equivalent fastener or the limb can be (3) fashioned into a hook and thus hooked over a marginal edge of the plate.

Then, too, it is within the purview of the concept to screw the short limb of each of a pair of diametrically opposite L-shaped clips on the exterior of the cover plate and to make the long limbs amply long that they can be extended not only well beyond the flanged component portions of the aforementioned protruding collar but also through and amply beyond side slots which are provided therefor on an auxiliary or extension rim (FIG. 7) which may be, and often is, needed and fits flatwise against the flange of said collar. Stated otherwise, it has been found that there is frequently a need for an extension rim (auxiliary or supplemental collar) in order to cope with a situation where the covered outlet box has been installed or set too deeply in the wall structure. When such is the case, the L-clips serve to not only anchor the plate-covered box but the extension rim or auxiliary collar too.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of an outlet box cover plate showing the same slightly modified in construction and provided with novel clip means whereby the cover plate can be oriented, lined up and properly anchored in the wall-hole with which it is cooperable.

FIG. 2 is a view in perspective of the cover plate with the clip means omitted.

FIG. 3 is a front elevation of the same.

FIG. 4 is a horizontal view in section and elevation showing the complete assemblage, that is, the outlet box, the cover plate, the manner in which it fits into a hole in the wall or panel and, what is more important, the attaching and retaining clips and how they are constructed and utilized.

FIG. 5 is a view in perspective of a type of clip such as is shown, for example, in FIGS. 1 and 4.

Figure 6:
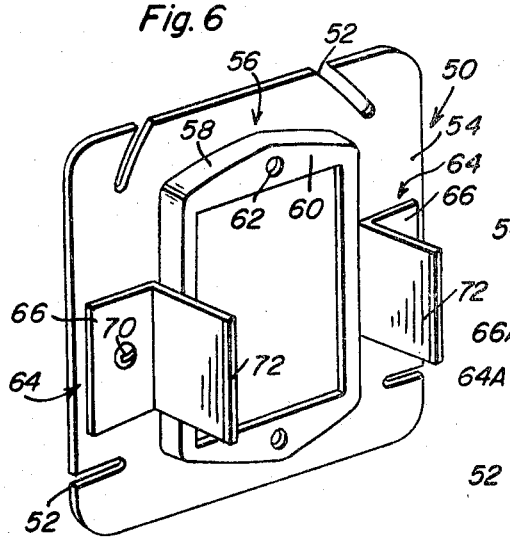
FIG. 6 is a view in perspective of a box cover plate by itself but provided with a pair of L-type attaching and retaining clips screwed in place thereon.

Attention is first directed to FIG. 4 because it shows wall means, for example, a hard wall panel 10 having an opening 12 therein which, as is usual, is intended to render the junction or electrical outlet box 14 accessible for use. The box 14 shown is a conventional type and has a bottom wall 16 encompassed by a marginal rim wall 18, the receptacle portion being provided, that is the walls thereof, with knock-out disks or plugs 20. The open front of the box is provided with suitable lugs (not detailed) which serve to accommodate attaching and retaining screws (not shown) and which function to mount the attachable and detachable cover plate 22 in place. Like the box, the cover plate is a substantially conventional type and comprises a rectangular plate whose flat exterior side is denoted at 24, the marginal edges being provided with circumferentially spaced kerfts or notches 26 and 28 which in use accommodate screws (not shown) for mounting the cover plate on and attaching it to the open front of the overall box 14. The centrally apertured portion of the cover plate is provided with an embossment which is here conveniently referred to as a piloting and positioning collar or neck 28 and which in practice fits into the wall hole 12 in the manner illustrated in FIG. 4. The collar comprises an endless rim 30 having turned in flange means 32 providing the usual lip means and which in turn is provided with screw threaded holes 34 for attachment thereto of a switch or receptacle concealing plate (not shown). The only structural change in the plate shown in FIG. 2 has to do with the diametrically opposite offset or bent portions each of which is denoted at 36 and which is provided near the collar 28 with a suitably elongated slot 38. This offset means 36 and slot 38 serve to accommodate one of a pair of plate anchoring clips. Each clip is denoted by the numeral 40 and as shown particularly well in FIG. 5 it comprises a substantially L-shaped strip member which is fashioned into a clip and provides an outer relatively long arm 42 and a complemental arm or limb 44. The limb 44 in this situation is fittingly seated in the recess provided in the bend or bent portion 36 and an edge portion of the limb 44 is then fashioned into an attaching hook 46 which is hooked over the marginal edge of the plate in the manner shown. Thus by passing the limbs 42 through the slots 38 provided therefor these limbs are capable of projecting through and beyond the wall opening or hole 12 whereupon the free edge portion 48 is then bent laterally and clenched against the surface of the wallboard 10 to in this manner (FIG. 4) attach and anchor the cover plate and to also mount and retain the box 14 which is attached to the cover plate.

The slight modification appearing in FIG. 6 is applied and functions in the manner shown. This adaptation comprises a cover plate 50 with marginal notches 52 and with a flat outer face 54 and a centrally apertured portion provided with a protruding piloting and locating collar 56 having an endless rim 58 and turned in flanges 60 with screw-threaded holes therein as at 62. In this form of the cover plate the indentations or bent portions 36 and slots 38 (FIGS. 1–3) are omitted. In other words, the plate portion is conventional and a pair of simple L-shaped clips are provided as attaching members. Each clip is the same in construction. A description of one clip, for example the one at the left end in FIG. 6, is denoted by the numeral 64. It comprises a short limb or leg 66 which is superimposed on the surface 54 at the desired point and is provided with a screw hole (see FIG. 7) as at 68 which serves to accommodate a headed screw-threaded fastener 70 (FIG. 6). The long limb here is denoted at 72 and is intended to serve in the same manner as the aforementioned limb 42, that is, it is passed through the wallhole and clenched in place in the manner shown in FIG. 4.

Figure 7:
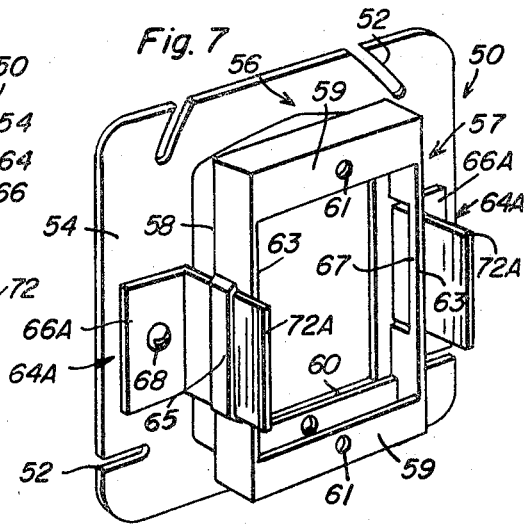
FIG. 7 is a view in perspective of FIG. 6 but with an extension rim or collar added and showing how the L-clips are connected to the slotted sides of said collar to hold it in place.
Figure 9:
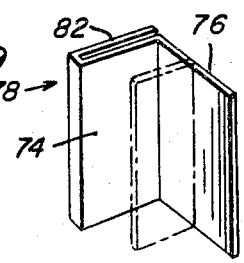
FIG. 9 is a view in perspective of one of the clips appearing in FIG. 8 with the outer end portion of the long limb laterally bent in phantom lines.

It is reiterated here that, as a result of trial and error experimentation, there is actually a need, often a definite necessity, for the adoption and use of an extension rim, that is the type of auxiliary or supplemental collar which is shown and the manner in which it is constructed and used in FIG. 7. This collar can be produced in various sizes and it is adapted to be superimposed on the flanged portion of the permanent or integral collar 56 also in the manner illustrated. With reference at this time to the illustration of the attached box in FIG. 4 it will be evident that, generally speaking, the flanged collar fits with requisite nicety into the opening 12 in the wall which is provided therefor. However, there are instances wherein an added or auxiliary orientating rim of the type shown in FIG. 7 is necessary. This is to say, the rim which is to be described here is utilized in cases where the outlet box is set too deeply into the construction surface and prevents the cover plate from being sealed by plaster or other construction materials. It will be further evident that in this construction and arrangement the cover plate and collar is the same as that illustrated in FIG. 6. Accordingly, the plate is denoted generally by the numeral 50 and the details thereof correspond with those illustrated at the left in FIG. 6. The auxiliary or supplemental collar in this arrangement is denoted at 57 and conforms or substantially so in shape and size to the collar means 56. Accordingly it comprises a frame whose upper and lower flanged portions 59 are provided with screw holes 61 corresponding to the screw holes 62 at the left in FIG. 6. The side members in this arrangement are denoted at 63 and each one is provided with a struck-out band or strap portion 65 which provides a slot or passage 67 at the right in FIG. 7. Also it will be evident here that the two L-shaped clips are denoted at 64A and conform or substantially so to the aforementioned L-clips 64. Accordingly, the short limb 66A carries an outstanding longer limb 72A which contacts the side member 63 and passes through the slot means 67. It follows therefore that the adaptation and arrangement herein under advisement is much the same as that shown and described in FIG. 6 with the addition thereto of the auxiliary collar or extension means 57. It is also evident that in practice the outer free end portion of the long limb 72A is bent laterally in the manner suggested in phantom lines in FIG. 9, that is, when the device is installed in the manner illustrated in FIG. 4.

Figure 8:
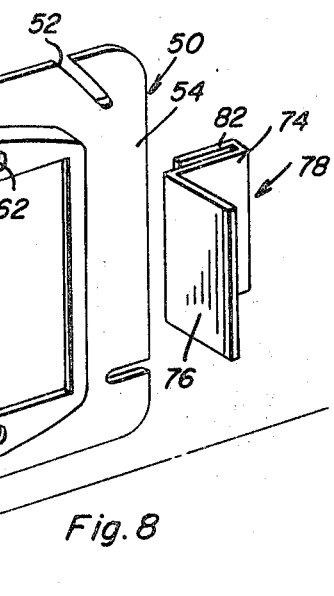
FIG. 8 is a view in perspective showing a conventional cover plate and a pair of improved readily attachable plate positioning and retaining clips.

The cover plate is the same in FIG. 8 and the same reference numbers are used here to identify like parts. In fact the only difference is in the construction of the clip means. Again the L-shaped basic idea is carried out in the clip construction so as to provide a short limb 74 and a long limb 76. The overall clip in each instance is denoted by the numeral 78 and here instead of using a fastener as at 70 in FIG. 6 the short limb 74 is provided with a return bend or bent portion 80 which defines an attaching and retaining hook 82 which is such that it is engaged over the edge of the cover plate 50 and is thus clenched and secured in place. Once the two clips 78 are applied to the cover plate it will be seen that the cover plate is then ready to be applied to the open front of the box whereby to permit the then covered box to be mounted in the wall opening 12 in the manner shown in FIG. 4.

It will be evident that the outlet box cover herein shown and described well serves the purposes for which it is intended. It is advantageous in that special brackets, screws and nails are not needed to mount the same in a hole in a wall (hard wall, plastered wall or the like). Significant time and labor is saved as can well be appreciated by the manufacturer, retailer and wire installing electrician. The clips are such that they bring the outlet box even with the surface of the construction panel to provide an installation which is safe, practical and otherwise desirable.

I claim:

1. For use in conjunction with cables, conduits, electricity conducting wires and the like; a conventional-type cup-like electrical outlet box having a rear wall marginally surrounded by a complemental rim wall and having built-in knockout plugs and open at its front, a readily applicable cover plate abutting and spanning said open front and having a centrally apertured portion marginally encompassed by a forwardly projecting collar with a turned-in flange and designed and adapted to fit conformingly and telescopingly into a hole provided therefor in a hardwall or similar prefabricated wall panel, clip means cooperable with predetermined portions of said cover plate, whereby the latter and outlet box can be capably oriented, aligned with, and anchored in place in said hole, said clip means comprising a pair of clips, each clip having an L-shaped portion providing long and short limbs, said short limb being secured to the front face of the cover plate with the long limb projecting forwardly along a surface of the cover plate collar, said long limb being of a length that it is adapted to project outwardly through and beyond the hole in said wall panel in a manner to permit a free end portion to be bent laterally outwardly and clenched and bound against the wall panel's exterior surface proximal to a coacting marginal portion of said hole.

2. The combination according to claim 1, and wherein said short limb is superimposed upon said front face of said cover plate and is detachably but securely mounted in an operatively functioning position thereon through the medium of a coacting headed screw-threaded fastener.

3. The structure defined and according to the combination set forth in claim 1 and, in combination therewith, an auxiliary collar constituting and providing an extension rim and superimposed upon the flange of the aforementioned collar, said auxiliary collar embodying side members provided with struck-out strips providing forwardly extending individual channels, and the long limbs of said clips projecting through and outwardly beyond said channels to permit the aforementioned free end portions thereof to be bent laterally and clenched.

4. For use in conjunction with cables, conduits, electricity conducting wires, and the like; a conventional-type cup-like electrical outlet box having a rear wall marginally surrounded by a complemental rim wall and having built-in knockout plugs and open at its front, a readily applicable cover plate abutting and spanning said open front and having a centrally apertured portion marginally encompassed by a forwardly projecting collar with a turned-in flange and designed and adapted to fit conformingly and telescopingly into a hole provided therefor in a hardwall or similar prefabricated wall panel, clip means cooperable with predetermined portions of said cover plate, whereby said cover plate and outlet box can be assembled and united and then oriented, alined with, and reliably operatively positioned in place in said hole, said clip means comprising a pair of clips, each clip having an L-shaped portion providing long and short limbs, said long limb having a portion thereof abutting a median surface portion of an adjacent margin of said collar and being of a length that it is adapted to project outwardly beyond the exterior surface of said collar in contact with said collar and through and beyond the hole in said wall panel to permit a free end portion to be bent laterally outwardly and clenched and anchored against the wall panel's exterior surface proximal to a coacting marginal portion of said hole, said short limb being securely connected with a coacting portion of the cover plate with which it is cooperatively secured.

5. The combination according to claim 4, and wherein said cover plate is provided with a slot which is adjacent and paralleling said collar and said long limb is passed outwardly through and beyond said slot.

References Cited
UNITED STATES PATENTS

| | | | |
|---|---|---|---|
| 843,962 | 2/1907 | McMurtrie | 220—3.4 |
| 1,069,425 | 8/1913 | Hornbeck | 220—3.4 |
| 1,490,252 | 4/1924 | Bissell | 220—3.6 |
| 1,935,565 | 11/1933 | Goetzelman | 220—3.4 |
| 2,692,697 | 10/1954 | Hamilton et al. | 220—3.6 |
| 2,808,172 | 10/1957 | Buckels | 220—3.4 |
| 2,987,211 | 6/1961 | Rudolph | 220—3.6 X |

THERON E. CONDON, *Primary Examiner.*

JAMES R. GARRETT, *Assistant Examiner.*

U.S. Cl. X.R.

174—58